Nov. 7, 1967  F. A. NORUK  3,351,904

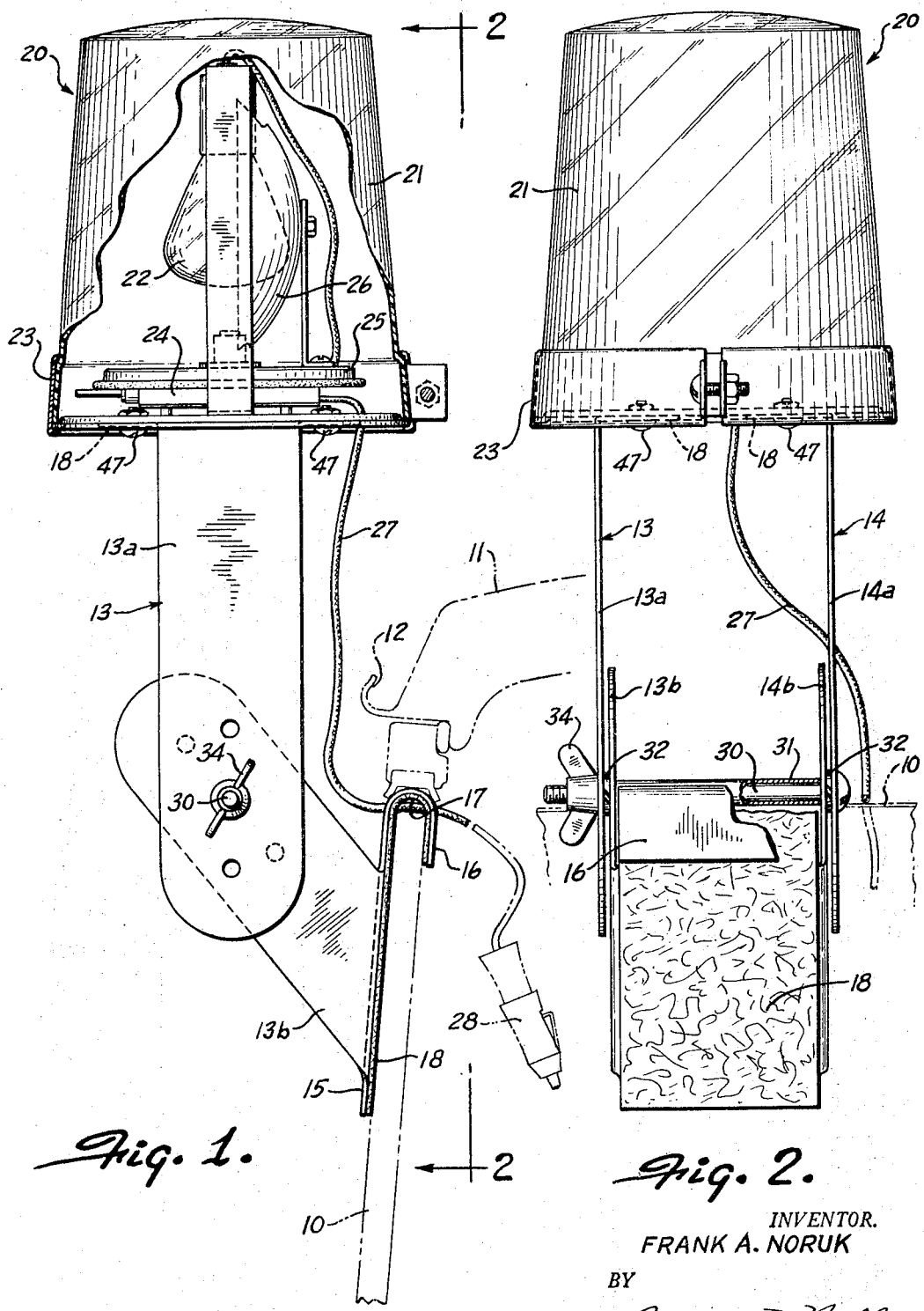

MOUNTING BRACKET FOR REVOLVING WARNING LIGHT FOR VEHICLES

Filed April 5, 1965  2 Sheets-Sheet 2

INVENTOR.
FRANK A. NORUK

BY
James E. Nilles
ATTORNEY

United States Patent Office 3,351,904
Patented Nov. 7, 1967

3,351,904
MOUNTING BRACKET FOR REVOLVING
WARNING LIGHT FOR VEHICLES
Frank Anthony Noruk, 1751 N. 119th St.,
Wauwatosa, Wis. 54177
Filed Apr. 5, 1965, Ser. No. 445,355
6 Claims. (Cl. 340—97)

This invention relates to warning lights for vehicles and of the type which are adapted to be quickly fastened to the window of a vehicle.

In police work, it is desirable at times to have a revolving red light on the car which acts as a warning light during the chase and apprehension of the suspects. It is conventional to mount these lights permanently on the vehicle usually on the roof where they can be seen from all directions. These permanent installations, however, have several disadvantages: for one thing, it is necessary to drill holes in or otherwise alter the vehicle, and this requires body work to put the vehicle back in original condition and detracts from the resale value of the vehicle when it is desired to resell it. Another disadvantage of permanently mounting the light is that it is often desirable to use unmarked police cars, that is, with no warning light visible. However, once the suspect has been located, it is then necessary to immediately give chase, and such urgency requires that the warning light be immediately available for use. It has heretofore been proposed to mount the revolving red light in the car adjacent the windshield, but even in this position, it is readily detectable by the suspect and therefore hampers surveillance and detective work.

It has also been proposed to mount these warning lights in a quickly detachable manner on the window of a car, but these prior art devices have not proved to be satisfactory for several reasons. For example, such a light must be mounted in a completely rigid manner so that it will not blow off or otherwise become detached from the window during high-speed chases. Additionally, the light must be located well above the car and in a level position so that its revolving beam strikes at the approximate window level of any surrounding cars.

It is accordingly an object of this invention to provide a bracket mounting for a revolving red light which will locate the light above the roof of the vehicle and in a level position so that the light beam will be properly directed for all 360 degrees of its swing. Furthermore, the bracket insures that the light can be quickly moved, from the seat adjacent the operator, for example, and installed on the window of the car and located above the roof, all in a matter of seconds and without the necessity of the operator leaving the car or even opening the door. The present bracket is particularly rigid and also securely fastened to the vehicle so that it will function properly and not become detached when in use. In addition, the present bracket is adapted to fit various models of vehicles regardless of the inclination of their windows and at the same time insure that the revolving light itself is set in a level position.

These and other objects and advantages of the present invention will appear as this disclosure progresses, reference being had to the accompanying drawings, in which:

FIGURE 1 is an elevational view of a bracket made in accordance with the invention and as applied to one type of vehicle, the view being taken generally from the rear of the car and at the operator's side thereof;

FIGURE 2 is a side elevational view of the bracket as shown in FIGURE 1, the view being taken generally along line 2—2 in FIGURE 1;

Figure 3:
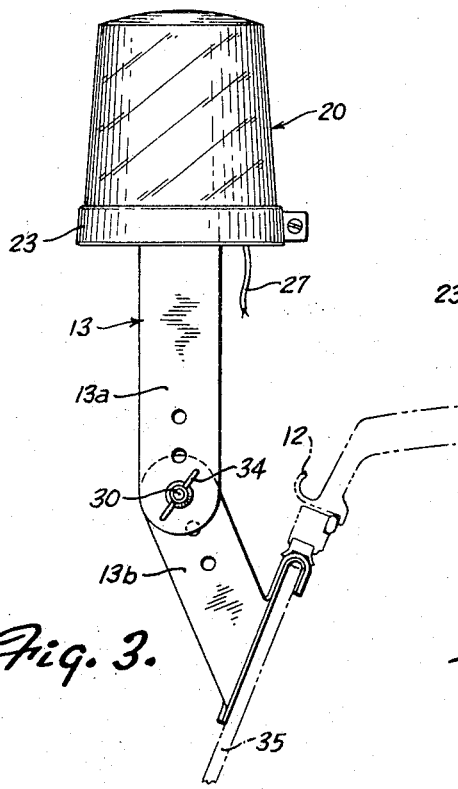
FIGURE 3 is a view similar to FIGURE 1 but showing the bracket as applied to a different type vehicle.

Referring in greater detail to the drawings, the vehicle shown in FIGURE 1 has a window 10 which is generally vertical, and the roof of the car is indicated at 11. The rain guter 12 of the car is located above the window and slightly to the outer side thereof. The bracket shown in FIGURE 1 is comprised of two sheet metal arms 13 and 14 which are arranged in parallelism and which extend generally upwardly and outwardly from the window when the bracket is attached to the window. At their lower ends, the arms are rigidly secured together by the sheet metal plate 15, as by being formed integrally therewith. The mounting plate 15 has a downwardly turned flange 16 formed along its upper side so as to provide a groove 17 that is adapted to fit over the upper edge of the window 10. Suitable material may be applied to the inner side of the plate 15 so as to prevent damage to the window and prevent slipping between the plate and the window. This slip-resistant material may take the form of a sheet of felt 18 which has been glued to the bracket, or it may take the form of a rubber composition material that has been sprayed on the bracket. It will be noted that the arms 13 and 14 are located downwardly from the top edge of the plate 15 to provide sufficient clearance for the protruding rain gutter 12 which extends differently in various models of vehicles and generally into the area between the plate 15 and the arms.

At the upper end of the arms, a red warning light 20 is located, and this light includes a red, transparent dome 21 in which is mounted a stationary, high-intensity, electric light bulb 22. An electric motor 24 is located in the base 23 of the light, which motor drives a revolving plate 25. Attached to this plate is an upwardly extending and concave reflector 26 which is located closely adjacent to the light bulb 22. An electric cord 27 extends from the motor 24 and through the window of the car and terminates in a plug 28. This plug is of the type that is adapted to be quickly inserted in the cigarette lighter of a car and thereby furnish electric power to the motor 24 and to the high-intensity light 22. As the motor 24 revolves the platform 25 and its associated reflector 26, the beam of light from bulb 22 is concentrated and swung through 360 degrees.

In order for this beam of light to be most effective, it is necessary that the base of the light be adjusted and positioned relative to the vehicle to which it is attached, so that the beam of light is maintained at a constant attitude to the ground over which the vehicle is moving so that it will direct the beam of light at the approximate window level of surrounding cars and for the complete 360 degrees of its travel.

This adjusting means is provided by a pivoted joint located in the upwardly extending bracket arms. The axis of this pivot is arranged in a front and rear direction, that is to say, longitudinally in respect to the vehicle.

For example, in FIGURE 1, the arms 13 and 14 are comprised of the lower, more or less fixed, sections 13a and 14a, respectively, and the upper portion of the arms 13 and 14 is comprised of sections 13b and 14b, respectively. The upper and lower arm sections are then pivotally connected together by a single long bolt 30 which extends therethrough. Mounted between the arms and around the bolt is a sleeve 31, and suitable lock washers 32 are provided between each of the arm sections so that when the wing nut 34 is drawn up tight on the threads of the bolt, the upper arms are rigidly secured in place. The particular bolt and sleeve mounting provides good rigidity for the upwardly extending arms and also provides a single and easily adjusted means for adjusting the light about a longitudinal axis from the inside of the car.

FIGURE 3 shows the same bracket attached to a vehicle having a window 35 that is inclined at more of an angle than the FIGURE 1 vehicle. It can be seen that by making this simple, single adjustment, the light has been adjusted to a proper position relative to the vehicle, that is, "level" relative to the vehicle, by permitting the upper sections of the arms to be pivoted outwardly relative to the lower sections of the arms.

Figure 4:
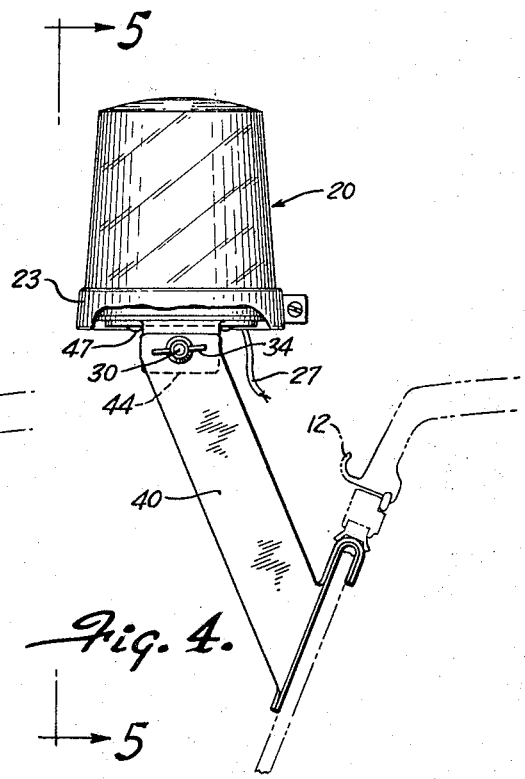
FIGURE 4 is a view similar to FIGURE 1 but shows a modified form of the bracket.
Figure 5:
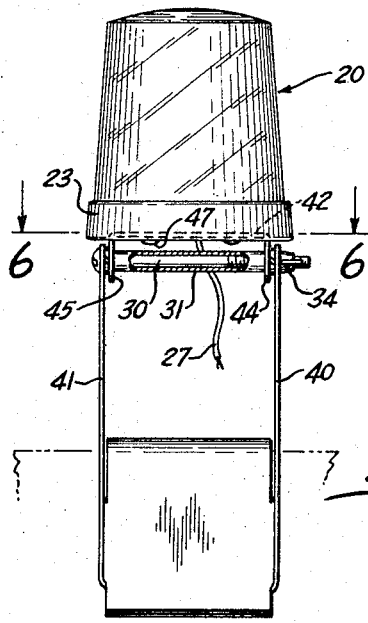
FIGURE 5 is an elevational, side view of the FIGURE 4 bracket, the view being taken generally along line 5—5 in FIGURE 4.
Figure 6:
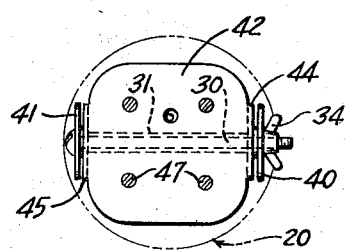
FIGURE 6 is a plan view taken generally along line 6—6 of FIGURE 5.

FIGURES 4 and 5 show a modification of the invention wherein the leveling means is located at the upper end of the arms, and the arms 40, 41 are themselves of one-piece construction. This modification includes the base member 42 which has downwardly extending side flanges 44 and 45. The bolt 30 and sleeve means 31 then extend through the upper ends of the arms and through the downwardly turned flanges of the base plate. This adjustment also can be made readily from the driver of the car while seated in the driving position.

In either modification, the light itself is mounted by bolt or screw means 47 which extend through the base 42 of the FIGURE 4 device, or through the inwardly turned flanges 18 of the upper arm sections of the FIGURE 1 device.

By means of the present invention, an easily and quickly attachable light is provided, the attachment of which is possible in a matter of seconds and without the officer leaving the vehicle. Leveling of the light is assured regardless of the variations in the slant or inclination of the window. The present light, when in operating position, is located well above the top of the car where it can be clearly seen, and when it is desired not to use the light, it can be quickly taken off and simply set adjacent the driver on the front seat.

The light provided by the present invention has found particular utility not only in police work but also as a warning light for utility vehicles such as gas and electric company cars.

Various modes of carrying out the invention are contemplated as being within the scope of the following claims particularly pointing out and distinctly claiming the subject matter which is regarded as the invention.

I claim:

1. A quickly detachable mounting bracket for a revolving red warning light for a vehicle, said bracket comprising, a mounting plate resting flat against the window and having means along its upper edge adapted to be slipped over the top edge of the vehicle window, arm means extending upwardly and outwardly from the plate and terminating above the vehicle roof when in the fully operative position, means for attaching said revolvable warning light at the upper end of the arm means, and adjustable means on said bracket for adjusting the light to a level position whereby the beam emitted from the revolving light will sweep around in a path which is at a generally constant attitude in respect to the ground over which the vehicle is traversing.

2. A quickly detachable mounting bracket for a revolving red warning light of the electrically actuated type and adapted to mount on the side window of a vehicle, said bracket comprising, a mounting plate having a downwardly turned flange along its upper edge and which is adapted to be slipped over the top edge of said vehicle window, slip resistant material on said mounting plate and on that side adjacent said window for abutting thereagainst, a pair of spaced apart arms extending upwardly and outwardly from the plate and terminating above the vehicle roof when in the fully operative position, a revolvable warning light at the upper end of the arms, adjustable means on said bracket between said light and plate and for adjusting the light to a level position whereby the revolving beam emitted from the revolving light will sweep around in a generally constant attitude to the ground over which the vehicle is traversing, said adjustable means including a pivot axis extending through said arms and in a longitudinal direction with respect to the vehicle.

3. A quickly detachable mounting bracket for a revolving red warning light of the electrically actuated type and adapted to fit on a window of a vehicle, said bracket comprising, a mounting plate resting flat against the window and having a downwardly turned flange along its upper edge and which is adapted to be slipped over the top edge of said vehicle window, a pair of spaced apart arms upwardly and outwardly extending from the plate and terminating above the vehicle roof when in the fully operative position, means for attaching said revolvable warning light at the upper end of the arms, said arms having a pivotal joint intermediate their length to form adjustable means on said bracket for adjusting the revolvable light to a level position whereby the revolving beam emitted from the revolving light will sweep around in a generally constant attitude in respect to the ground.

4. A bracket as defined in claim 3 including bolt means extending through and forming said pivotal joint of said arms, and a sleeve on said bolt means and between said arms to hold them in rigid spaced apart relationship.

5. A bracket as defined in claim 4 including slip resistant material on said plate and adapted to abut against said window.

6. A quickly detachable mounting bracket for a revolving red warning light of the electrically actuated type, said bracket comprising, a mounting plate resting flat against the window and having downwardly turned means along its upper edge and adapted to be slipped over the top edge of a vehicle window, arm means extending upwardly and outwardly from the plate and terminating above the vehicle roof when in the fully operative position, means for attaching said revolvable warning light at the upper end of the arm means, and adjustable means on said bracket for adjusting the revolvable light to a level position whereby the revolving beam emitted from the revolving light will sweep around at a generally constant attitude to the ground over which the vehicle is traversing, said adjustable means including a mounting base for said light, said base being pivotally attached to the upper end of said arm means for adjustment about a front and rear axis in respect to the normal direction of vehicle travel.

References Cited

UNITED STATES PATENTS

| 2,814,029 | 11/1957 | McRea | 340—87 |
| 2,891,235 | 6/1959 | Halpert | 340—87 |
| 2,996,607 | 8/1961 | Witt | 340—87 X |
| 3,178,568 | 4/1965 | Hendershot | 340—87 X |
| 3,264,607 | 8/1966 | Sherman | 340—87 |
| 1,756,942 | 5/1930 | Eddy et al. | 240—52.1 X |
| 2,797,310 | 6/1957 | Moore | 240—52.1 X |
| 2,908,811 | 10/1959 | Duddy | 240—52.1 |
| 2,920,185 | 7/1960 | Conrod | 340—97 X |

THOMAS A. ROBINSON, *Primary Examiner.*

NEIL C. READ, *Examiner.*

I. J. LEVIN, *Assistant Examiner.*